G. G. PORTER.
BACK FACING ATTACHMENT FOR LATHES.
APPLICATION FILED AUG. 9, 1917.

1,385,491. Patented July 26, 1921.
3 SHEETS—SHEET 1.

Inventor:
George G. Porter
By
Parsons & Bodell
Attorneys.

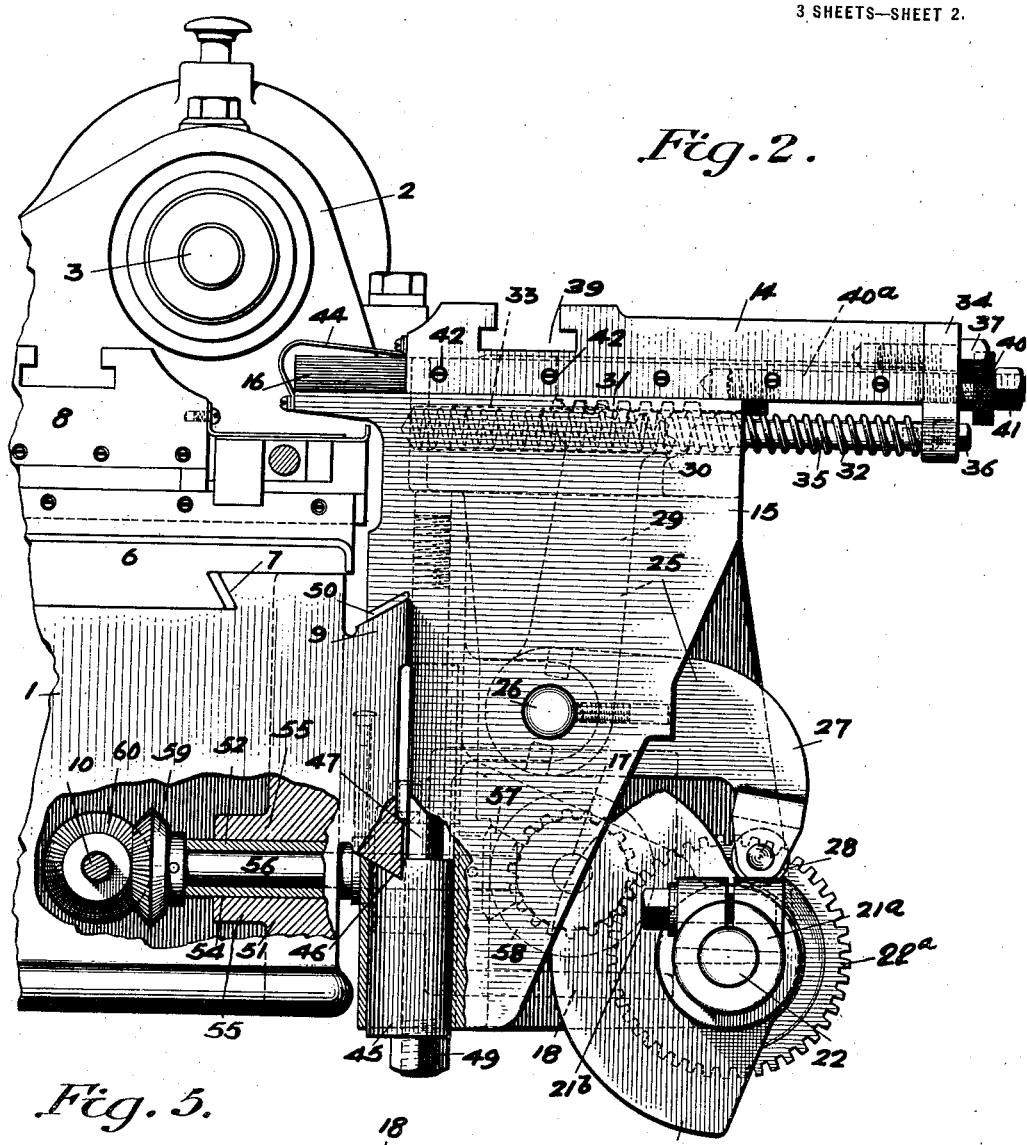
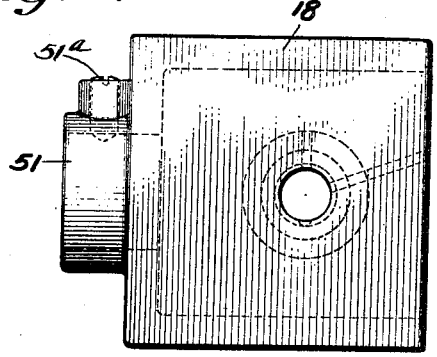

G. G. PORTER.
BACK FACING ATTACHMENT FOR LATHES.
APPLICATION FILED AUG. 9, 1917.
1,385,491.
Patented July 26, 1921.
3 SHEETS—SHEET 3.
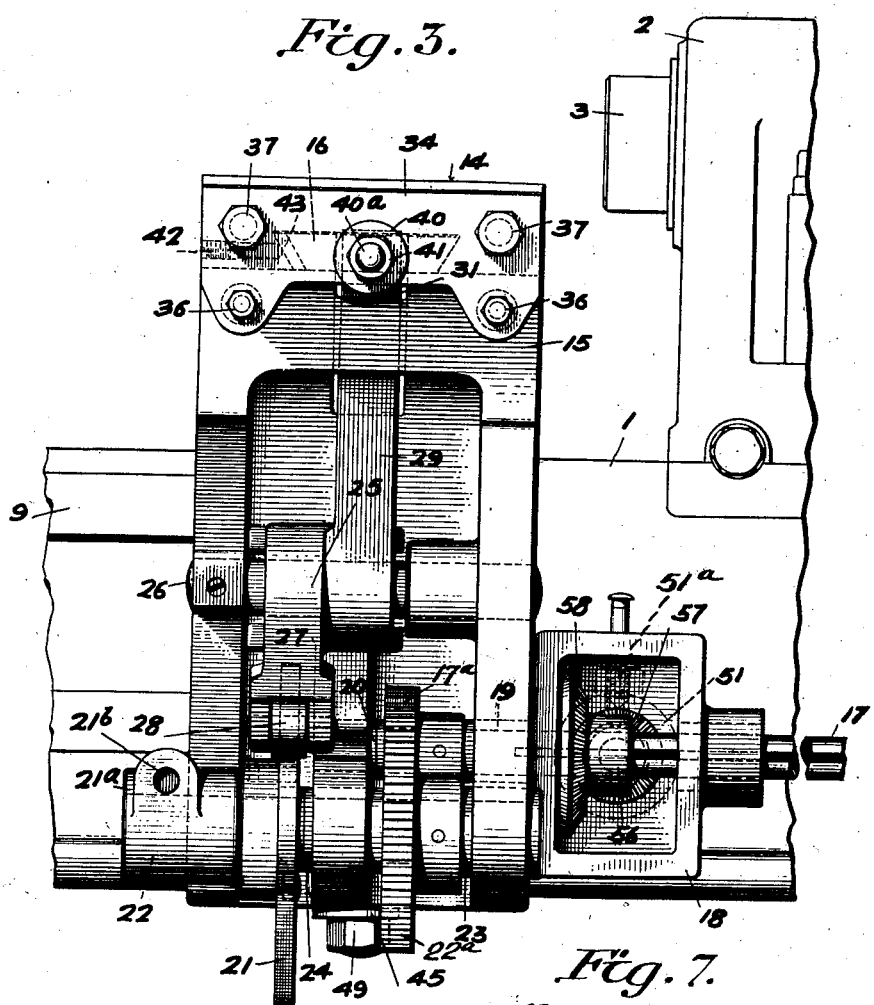
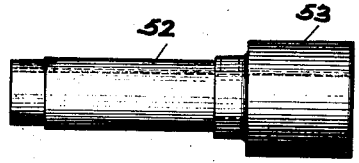
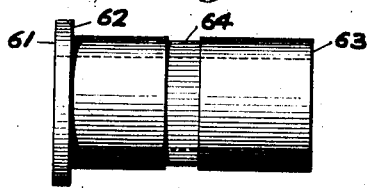

UNITED STATES PATENT OFFICE.

GEORGE G. PORTER, OF SYRACUSE, NEW YORK, ASSIGNOR TO THE PORTER-CABLE MACHINE COMPANY, OF SYRACUSE, NEW YORK, A CORPORATION OF NEW YORK.

BACK-FACING ATTACHMENT FOR LATHES.

1,385,491.   Specification of Letters Patent.   Patented July 26, 1921.

Application filed August 9, 1917. Serial No. 185,262.

*To all whom it may concern:*

Be it known that I, GEORGE G. PORTER, a citizen of the United States, and a resident of Syracuse, in the county of Onondaga and State of New York, have invented a certain new and useful Back-Facing Attachment for Lathes, of which the following is a specification.

This invention has for its object, the production of an attachment for lathes which is particularly simple in construction and readily attachable to the lathe in position to carry a tool or a gang of tools, for automatically operating upon the work at the same time or during the same period that the tool or tools carried by the regular work carriage are operating upon the same piece of work. The invention consists in the combinations and constructions hereinafter set forth and claimed.

In describing this invention, reference is had to the accompanying drawings in which like characters designate corresponding parts in all the views.

Fig. 2 is a side elevation, partly in section, of the frame of the attachment, the contiguous parts of the lathe being also shown, the tool holder of the attachment being omitted.

Fig. 3 is a rear elevation of parts seen in Fig. 2.

Figs. 5 and 6 are side elevations of the support for the shaft of the attachment and the shank of said support.

Fig. 7 is a detail view of one article produced by a lathe equipped with this attachment.

Figure 1:
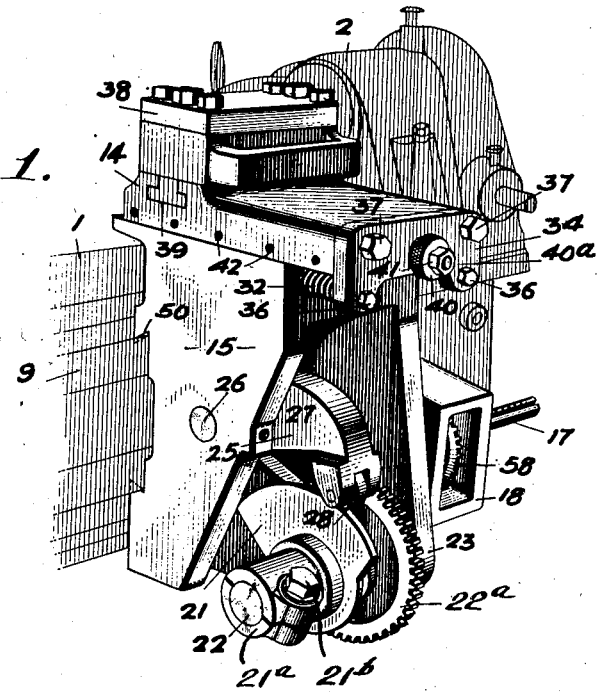
Figure 1 is a perspective view of the attachment taken from the rear side thereof, the contiguous part of a lathe being also shown.

Heretofore, in manufacturing small pieces such operations as turning and facing bushings, turning, facing and grooving automobile pistons, and turning, necking or shouldering shafts and studs and similar parts, have been done in several consecutive operations, the article first being placed between the centers of a regular engine lathe and a turning operation performed by a tool or tools carried by the regular work carriage which feeds lengthwise of the bed and thereafter the facing operations performed in another lathe or in the same lathe after changing the tools.

One of the objects of this invention is an attachment by which the facing and other operations can be performed while the turning operations are taking place, by a gang of tools mounted on a carriage movable automatically in a direction crosswise of the axis of the lathe spindles, to perform the facing operations simultaneously or during the same period, that the tool carried by the regular work carriage is cutting lengthwise of the article.

This invention therefore comprises a lathe having two tool carriages located on opposite sides of the axis of the lathe spindles, one carriage being feedable lengthwise of said axis, and the other in a direction crosswise thereof, and means for feeding both carriages simultaneously.

Preferably, the carriage on the rear side carrying the tools performing the back facing operations is part of an attachment readily attachable to the lathe.

1 designates the bed of the lathe; 2, the head stock carrying the live spindle 3; and 4, the tail stock carrying the spindle 5.

6 is the usual work carriage movable along ways 7 provided on the bed 1 and carrying a suitable cross feed carriage 8 supporting the tool or tools for performing the turning operations. The tail stock 4 is slidable by hand along a suitable way 9 on the rear side of the bed 1. The carriage 6 is operated automatically along the ways 7 as by a shaft 10 and a rack and pinion, not shown. The shaft 10 is connected to the usual lathe mechanism unnecessary to be described. As the feed mechanism of the work carriage forms no part of this invention and is unnecessary to the understanding thereof, further description is thought to be unnecessary. The only feature of importance that need be considered in so far as this invention is concerned, is the shaft 10 or other element common to the actuating mechanism of the usual work carriage 6 and the carriage of the back facing attachment. The cross feed carriage 8 is fed along suitable ways 13 in the usual manner.

The mechanism, thus far described, forms no part of this invention, and as the same is well known to those skilled in the art further description is thought to be unnecessary.

The tool carriage located on the rear side of the axis of the lathe spindles 3, 5 and movable in a direction crosswise of said axis, is here shown as carried by a support mounted upon the ways 9 upon which the tail stock 4 is mounted, and as actuated by means which operate during the feeding movement of the carriage 6, and usually the actuating means receives its power from the feed shaft 10 which is connected to the carriage 6 by suitable gearing.

14 designates the tool carriage which is mounted upon a support 15 for convenience called herein in a frame, said frame 15 having a groove complemental to the way 9 on which the tail stock 4 is mounted. The carriage 14 and frame 15 are connected by dove tailed ways of any well known construction, as seen in Figs. 1, 2 and 3, the frame 15 having a dove tail or guide 16, and the carriage having a complemental groove. The usual gib plate is also used.

The actuating means for reciprocating the carriage 14 comprises a rotatable element as a shaft 17 journaled and slidably mounted in a suitable fixed support or housing 18 attachable to the lathe, and in alined bearings 19 and 20, Fig. 3, in the frame 15, power transmitting means supported by and movable with the frame 15 and connected to the shaft 17 to rotate with the shaft, and driving means between the shaft 10 and the shaft 17. In this embodiment of my invention, the shaft 17 slides axially through the housing 18 to provide for the adjustment of the frame 15 along the ways 9.

The power transmitting connections, as here shown, comprise a cam 21 mounted on a shaft 22 journaled in alined bearings 23, 24 supported by the frame 15, slightly below and to the rear of the bearings for the shaft 17, and an angle lever 25 mounted on a shaft or arbor 26 mounted in the frame 15 above the shaft 17 and beneath the carriage 14, one arm 27 of the lever having a roller 28 thereon coacting with the cam 21 and the other arm 29 having a segment 30 at its other end coacting with a rack 31 secured to the carriage 14 on the lower side of said carriage 14 and centrally thereof. The rack 31 extends in a slot formed centrally of the way 16 and is adjustably secured to the carriage.

The cam 21 is detachably mounted on the shaft 22 in order that it may be interchangeable with cams of other shapes, and it is here shown as being mounted on a split hub 21ª which is secured or clamped on the shaft by a clamping screw 21ᵇ extending through lugs on opposite sides of the split of said hub. In use the split hub can be readily removed and the cam 21 replaced by another cam.

The shafts 17 and 22 are connected together by intermeshing gears 17ª, 22ª mounted respectively on said shafts.

Obviously, rotation of the shaft 22 in one direction causes the cam 21 to move the lever 25 to carry the tool carriage 14 to the left, Fig. 2 toward the work held by the spindles 3, 5, and the carriage 14 is returned in the opposite direction to its starting position, and the angle lever 25 also is returned by spring means so that its roller 28 will follow the low lines of the cam 21. This spring means, as here shown, includes a pair of springs 32 located on opposite sides of the center of the carriage 14 and below the same, the springs being movable in suitable guides or sockets 33 formed in the upper portion of the frame 15, the springs projecting beyond the rear face of said frame and abutting at their outer ends against the inner side of an end plate 34 on the carriage 14.

The springs are prevented from buckling by rods 35 fixed to the end plate 34 by screws 36, the rods being located within the coils of the springs 32 and telescoping into the sockets 33. The end plate 34 is secured to the main body of the carriage 14 by screws 37.

38 is a tool holder for carrying a gang of back facing tools, this holder having a suitable means which fits the T-slot 39 in the carriage 14.

The adjustment of the carriage, in order that the tools may coact properly with the work, is determined by means of a knurled nut 40 threading on a screw 40ª against the face of the plate 34, the screw being fixed relatively to the rack 31, and it being here shown as threading thereinto as shown in dotted lines, Fig. 2. Obviously, by turning the nut 40 in one direction, as to the right, it threads farther onto the screw 40ª, and the carriage 14 is moved forwardly or to the left against the action of the springs 32, and when said nut 40 is turned in the other direction, the carriage will be moved rearwardly as the nut loosens, by the springs 32. The rack 31 to which the screw 40ª is fixed is held from movement during these adjustments by reason of its being in mesh with the segment 30, and the rack 31 is caused to move as a unit with the carriage 14 during the actuation of the segment, by the screw 40ª, nut 40 and the spring 32. The nut 40 is held in its position by a lock nut 41.

Any looseness between the carriage and the ways 16 is compensated for by means of screws 42 having their heads exposed on one of the sides of the carriage 14, the screws coacting with the gib plate 43. Chips from the work are prevented from fouling the way 16 by a suitable flexible shield or apron 44 fixed at its opposite edges to the front end of the frame 15 and the front end of the carriage 14.

The frame 15 is held in its adjusted position by means for tightening the same onto the ways 9 of the bed, this means being here shown as consisting of a cylindrical clamp block 45 extending vertically into a passage in the frame from the lower side thereof, the passage partly opening into the groove in which the way 9 is located, the block having a notch 46 at its upper end which fits the lower side of the way 9. This clamping block 45 has an eccentric lengthwise passage therethrough which extends at one side of the way 9, and through which a rod 47 extends, the rod being fixed and threading at its upper end in the frame 15. A clamping nut 49 threads on the lower end of the rod against the lower side of the clamping block. When this attachment is furnished to a customer having a lathe, a gib plate 50 is furnished of a standard thickness and the purchaser machines the plate to the proper thickness to fit his particular lathe, and when so fitted upon tightening of the nut 49, the frame 15 is rigidly clamped in a right line to the way 9, without distortion or tilting as when set screws are used.

Figure 4:
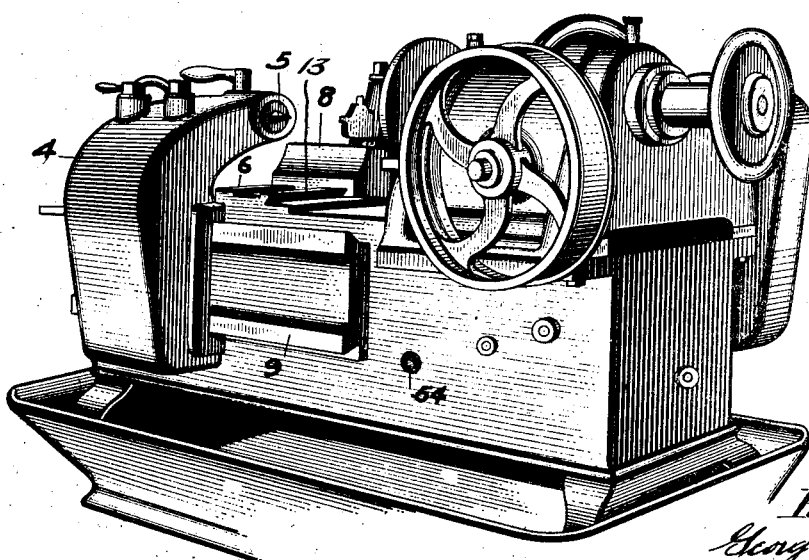
Fig. 4 is a perspective view, partly broken away, taken from the rear side of one form of lathe for which this attachment is applicable.

The support or housing 18 for the shaft 17 as shown in Fig. 5 is provided with a hub 51 on the rear side thereof which fits on and is secured to the enlarged end 53 of bushing 52 by a set screw 51ª. The enlarged end 53 of bushing 52 is made slightly greater in external diameter than the diameter of bevel pinion located therein as hereinafter described, so that the housing 18 can be assembled to or removed from the bushing 52 while this pinion 57 is in place. The bushing 52 is a "drive fit" in the opening 54, Figs. 2 and 4, in the rear of the bed, and extends through the boss 55 which is formed on the inner side of the bed to provide additional length for the support of the bushing 52.

The shaft 17 is actuated from the shaft 10 by means of the shaft 56 journaled in the bushing 52 and extending into the support or housing 18, a bevel pinion 57 located at the outer end of said shaft 56 outside of the enlarged head 52 of the bushing 53 and meshing with a bevel gear 58 slidably mounted on the shaft 17 within the box or housing 18, and a bevel gear 59 fixed on the inner end of said shaft 56 and meshing with a bevel gear 60 on the feed shaft 10. Thus, the motion is transmitted from the feed shaft 10 through the gears 60, 59 and the shaft 56, gears 57, 58, shaft 17, gears 17ª, 22ª, shaft 22, cam 21, lever arms 27, 29, segment 30 and rack 31 to the carriage 14. The support 18 is in the form of a housing or box open at its front side and having alined bearings in its lateral sides for the shaft 17.

The lathes are furnished with openings 54 and when the attachment is furnished to a customer, he simply drives the bushing 52 through the opening 54 until it is positioned so that the gear 59 will mesh properly with the gear 60, the shaft 56 which is furnished assembled to the gear 57, is then placed in the bushing and the gear 59 secured to it. The housing can then be loosely mounted on the enlarged end 53 of the bushing 52. The frame 15 is then mounted on the ways 9 of the bed, passing the shaft 17 through the bearings in the housing 18 and gear 58. The housing can then be secured in place by a set screw 51ª. Thus, the attachment can be readily applied to the lathes. The gear 60 is usually provided for the purpose of meshing with a companion gear operable by a hand wheel on the front of the lathe. From the foregoing, it will be apparent that the attachment consists of two units, one, the support 18 having means for fixing it to the lathe bed, and the other being the frame 15 and parts carried thereby and having means for mounting the same on the tail stock ways or other guides, actuating mechanism associated with fixed unit and connectible to some part of the lathe mechanism, and power transmitting means slidable with the movable unit and having sliding connection with the actuating mechanism.

By this attachment and its arrangement, a tool or gang of tools can be performing the operations of facing, grooving, necking, etc., at the same time the usual work carriage is feeding forwardly taking longitudinal cuts, so that all the operations are completed within the same time required for the longest longitudinal cut, and moreover the machining is more carefully and accurately done and a more exact duplication of parts can be obtained than is possible when the piece is machined in several consecutive operations.

One example of the economy effected by the use of my attachment is shown in Fig. 7 which is a bushing ordinarily brought to the lathe with the central bore and the large end faced by a prior operation.

By my machine, the longitudinal cuts are performed on the bushing by the tool on the regular work carriage which is being fed lengthwise of the work, while the facing at 61, 62 and 63 and the necking or groove at 64 at the center is formed by the tools on the carriage of the back facing attachment, the cam 21 being so positioned that the operations of the tools on the latter carriage complete their work at the same time the tools on the former carriage complete the longitudinal cuts. By the former method, this particular piece required 2¾ minutes while by the use of my attachment 45 seconds are required.

What I claim is:

1. The combination with a lathe, comprising a bed having a guide on the rear side thereof, and a tool carriage feedable automatically along the bed in front of the axis of the lathe spindles, a frame mounted on the guide and adjustable along the same in the rear of the axis of the lathe spindles, a second tool carriage carried by the frame and movable thereon in a direction crosswise of the axis of the lathe spindles, means for feeding the first tool carriage including a driving element, and means moving the second tool carriage crosswise of said axis during the feeding of the former tool carriage, the latter means being connected to said element, substantially as and for the purpose described.

2. The combination with a lathe comprising a bed having tail stock ways, a tool carriage feedable automatically along the bed on the front side of the axis of the lathe spindles, and a tail stock adjustable along said ways, of a frame mounted on the ways of the tail stock and located in the rear of the axis of the spindles, a second tool carriage mounted on the frame and adjustable thereon in a direction crosswise of the axis of the lathe spindles, and means for moving the second tool carriage, substantially as and for the purpose set forth.

3. The combination of a lathe comprising a bed formed with a tail stock guide, a frame mounted on the guide and movable along the same, a tool carriage mounted on the frame, and means for moving the tool carriage, substantially as and for the purpose described.

4. The combination with a lathe comprising a bed having ways on the rear side thereof, a tool carriage feedable automatically along the bed on the front side of the axis of the lathe spindles, and a tail stock movable along said ways, of a frame mounted on the ways of the tail stock and adjustable along the same, a second tool carriage mounted on the frame and adjustable thereon in a direction crosswise of the axis of the lathe spindles, and means for actuating the second tool carriage, substantially as and for the purpose set forth.

5. The combination of a lathe having a tail stock and a head stock, mechanism for actuating the head stock, a frame adjustable lengthwise of the lathe between the head stock and the tail stock, a tool carriage mounted on the frame and movable relatively thereto toward and from the axis of the spindles supported by the head stock and the tail stock, and means operated by said mechanism for moving the tool carriage in a direction transversely of the axis of the spindle, substantially as and for the purpose described.

6. The combination of a lathe comprising a bed formed with a guide on the rear side thereof, a tail stock mounted on the guide, a frame also mounted on the guide and adjustable along the same, a tool carriage mounted on the frame and movable thereon toward and from the axis of the spindles of the lathe and means for moving the tool carriage, substantially as and for the purpose set forth.

7. The combination of a lathe comprising a bed formed with a guide, a frame mounted on the guide and adjustable along the same and formed with a bearing, a tool carriage mounted on the frame and movable thereon, and means for moving the tool carriage comprising a shaft journaled in said bearing of the frame, power transmitting means between the shaft and the carriage, an element mounted on the shaft to drive the same, the latter means and the shaft being movable with the frame relatively to said element, substantially as and for the purpose set forth.

8. The combination with a lathe comprising a bed formed with a guide, a frame mounted on the guide and adjustable along the same, a tool carriage mounted on the frame, the frame being formed with a bearing, means for moving the tool carriage comprising a shaft journaled in the frame bearing, a second shaft journaled in the frame, intermeshing gears mounted respectively on the shafts, a cam mounted on the second mentioned shaft, and a lever pivoted to the frame and coacting at one end with the cam and at its other end with the carriage, substantially as and for the purpose specified.

9. An attachment for lathes comprising a unit for securement to the lathe bed, a second unit slidably mounted on the lathe bed and including a frame, a movable carriage carried by the frame, actuating mechanism comprising driving and driven shafts journaled in the first mentioned unit and connected together, the driving shaft having means for connection to the lathe mechanism, and the driven shaft being connected to one of said units, and power transmitting mechanism carried by the second unit, substantially as and for the purpose set forth.

10. An attachment for lathes having a tail stock way on the rear side thereof, the attachment comprising a fixed unit having means for securement to the bed of the lathe, a movable unit comprising a frame mounted on and movable along the ways for the tail stock, a tool carriage carried by the frame, and power transmitting mechanism for actuating the carriage carried by said frame and movable therewith along the ways, and driving and driven shafts journaled in the fixed unit and arranged at an angle to each other and having intermeshing gears, the driving shaft extending transversely through the rear side of the lathe bed and having means at its inner end for connection to the driving mechanism of the lathe, and the driven shaft being slidable axially relatively to the gear thereon during the adjusting of the movable unit along the tail stock ways, substantially as and for the purpose described.

11. An attachment for lathes comprising a fixed unit formed with bearings, and having a hollow shank associated therewith insertible transversely through the rear side of the lathe bed, a movable unit slidably mounted on the bed on the rear side thereof and having movable power transmitting mechanism associated therewith, and actuating means for said mechanism including driving and driven shafts journaled in the fixed unit at an angle to each other, the driving shaft being arranged in the bushing and connected at its inner end to the lathe mechanism, and the driven shaft being connected to the mechanism of the movable unit, substantially as and for the purpose specified.

12. The combination with a lathe, of an attachment mounted on the lathe including a frame formed with a bearing, and a carriage movable on the frame, a fixed support having a bushing connected to the support extending through an opening in the lathe bed, the support being formed with a bearing having its axis at an angle to that of the bushing, a shaft in the bushing, and a shaft journaled in the bearings of the support and the frame, intermeshing gears mounted on the shafts respectively, and power transmitting mechanism between the last mentioned shaft and the tool carriage including parts carried by and movable with the frame, substantially as and for the purpose set forth.

13. The combination with a lathe including a bed having an opening therein, of an attachment mounted on the lathe and including a unit mountable on the frame of the lathe and including a movable part, a fixed unit including a support having an opening in one side thereof, a bushing insertible in said opening and having an enlarged head fitted in the opening of the support and secured thereto, and power transmitting means between the lathe mechanism and said movable parts of the first mentioned unit including a shaft journaled in the bushing and having gears on opposite ends thereof, one being located outside of the enlarged head of the bushing and exposed in the support, and the other abutting against the end of the bushing, and a shaft journaled in the support and having a gear meshing with the gear in said enlarged head, substantially as and for the purpose described.

14. The combination with a lathe having a driving mechanism, of an attachment therefor including a tool carriage, means for actuating the carriage, a support for said means mounted on the back of the lathe bed and having alined bearings and also a bearing arranged at an angle to the alined bearings, a shaft journaled in the alined bearings, a second shaft journaled in the other bearing, intermeshing gears on the shafts, connections between the first mentioned shaft and the carriage, and connections between the second mentioned shaft and the lathe mechanism, substantially as and for the purpose set forth.

In testimony whereof, I have hereunto signed my name, at Syracuse, in the county of Onondaga, and State of New York, this 4th day of June, 1917.

GEORGE G. PORTER.